April 8, 1952  J. I. HARPER ET AL  2,592,419
LEAD LINED VESSEL
Filed Jan. 20, 1948
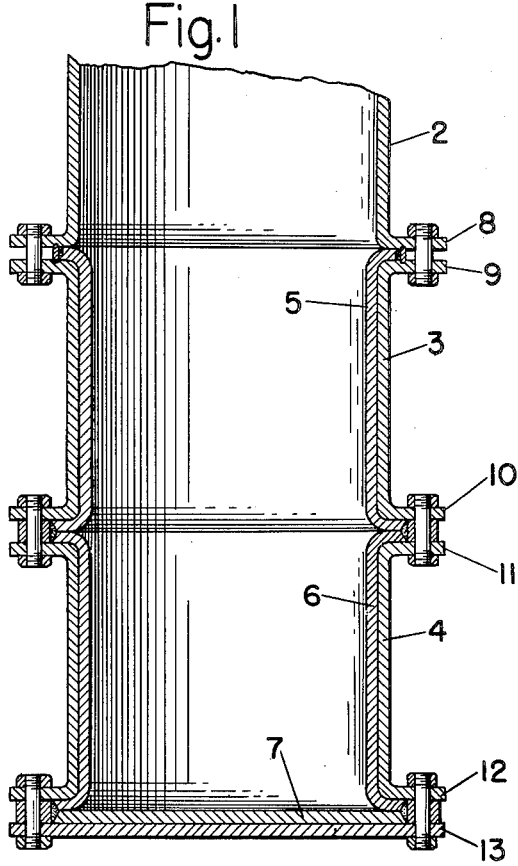
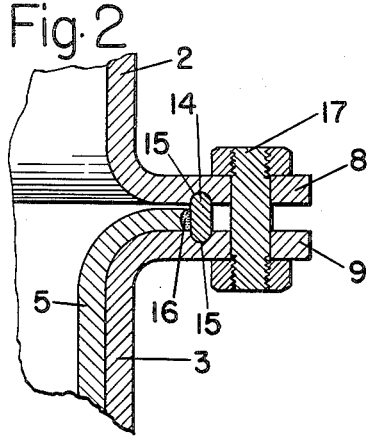
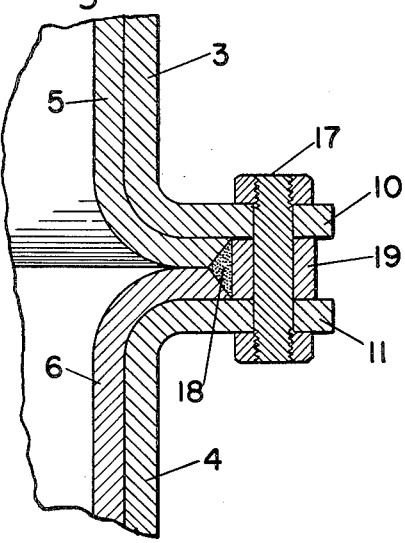
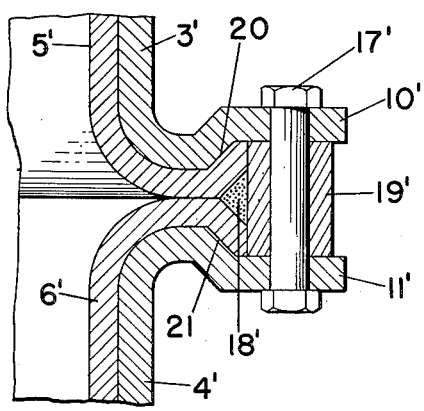
INVENTORS
JAMES I. HARPER
FRANK R. SHUMAN JR.
RALPH C. PETERS
By *Busser and Harding*
Attorneys Patented Apr. 8, 1952

2,592,419

UNITED STATES PATENT OFFICE 2,592,419

LEAD LINED VESSEL

James I. Harper, Media, and Frank R. Shuman, Jr., Chester Springs, Pa., and Ralph C. Peters, Haddonfield, N. J., assignors to Sun Oil Company, Philadelphia, Pa., a corporation of New Jersey Application January 20, 1948, Serial No. 3,363

1 Claim. (Cl. 220—63)

This invention relates to a lead lined fluid container or vessel having utility in many ordinarily metal corrosive chemical or other operations. More specifically the invention comprises a novel manner of forming and suspending a lead lining in a tower or vessel as well as a pressure-tight joint of several lead liner sections.

The property of lead known as "creep," or lack of good elasticity, precludes its use as a material of construction for withstanding elevated mechanical or even fluid pressures, particularly at rather elevated temperatures. Thus, it has been found to be unsatisfactory to make a seal pressure-tight by merely gripping the end of a lead lining, or the ends of lead lining sections, between bolted flanges of tower sections for the reason that shortly after the bolts have been drawn up the jointing is no longer pressure-tight due to the lead having suffered a strain produced by the stress imposed by the pressure of the flanges. Even when grooved flanges with an interposed sealing ring are employed to hold the lead it is subjected to great stresses which must invariably result in a permanent strain, thus loosing the pressure-tight characteristic which might have existed at the moment of drawing up the flange bolts. Directly the mechanical pressure, due to the flange bolts, becomes relieved, the fluid pressure, within the vessel operates to cause "creeping" of the lead within the jointing, ultimately resulting in a "blowout."

An object of this invention is to provide a novel method of lead lining a tower which will be leak-proof at elevated pressures at temperatures up to the melting temperature of the lining and which will not be subject to "blowouts."

Other objects and advantages of the invention are apparent from this specification, the claim and the drawing.

Figure 1 is a vertical sectional view of a lead lined vessel embodying my invention.

Figure 2 is an enlarged detail vertical sectional view of the connection between two of the tower sections shown in Figure 1.

Figure 3 is an enlarged detail sectional view, similar to Figure 2, of the connection between two other of the tower sections shown in Figure 1.

Figure 4 is an enlarged detail sectional view, similar to Figure 3, of a modification.

In Figure 1 of the drawing there are shown substantially three tower sections 2, 3 and 4 containing a lead lining composed of lining members 5, 6 and 7. The tower sections are provided with flanges 8, 9, 10, 11 and 12. A tower bottom plate 13 closes the tower at its bottom.

Lead lining member 5 extends from a position intermediate flanges 8 and 9 to a position intermediate flanges 10 and 11. Lead lining member 6 extends from a position intermediate flanges 10 and 11 to a position intermediate flange 12 and tower bottom plate 13. Lead lining member 7 extends over plate 13 to a position intermediate flange 12 and said plate. Thus, it is possible to line a fluid container or conduit only partially. Also, it is within the scope of the invention to line a container or conduit over a portion taken intermediate of its ends. When this is done and the section corresponds to one conduit section the ends of the lining will be attached or anchored as shown in Figure 2. When the lining extends through more than one conduit section the ultimate ends thereof will be anchored as just stated and the ends of adjacent lining sections will be attached together as shown in Figures 3 or 4.

In Figure 2 of the drawing is shown the detail of the suspension of lead lining member 5. According to the method of the invention, lead liner member 5 is placed within tower section 3 and worked out over a portion of flange 9, as shown. A sealing ring 14 is placed into ring receiving groove 15 in flange 9. The edge of lead liner member 5 is then fused to sealing ring 14 as shown at 16. Finally tower section 2 is held in sealing engagement with tower section 3 by means of flanges 8 and 9, said sealing ring and tower bolts 17.

It will be apparent that no substantial mechanical pressure is required to be exerted upon any portion of lead liner member 5 to form a pressure-tight seal. The sealing ring to which the lead liner member has been fused supports whatever weight of said liner remains unsupported by the portion thereof curved over flange 9. Fluid pressure, either within or without the tower, will not be able to cause creeping of the lead because any such pressure is borne exclusively by flanges 8 and 9 and sealing ring 14 held together by bolts 17. Thus, it is that a tower can be lined with lead, or other material such as lead, beginning at some point along its vertical length. Such towers are useful in operations wherein different conditions of temperature and/or pH are employed in different sections of a tower. If corrosive material or effect is to be withstood only in a portion of a tower the upper end of the lining thereof can be begun as described.

In Figure 3 of the drawing is shown the detail of the pressure-tight joining and suspension of the bottom end of the lead liner member 5 and the upper end of lead liner member 6. In this figure the ends of the lead liners are fused together as shown at 18. A blocking or retaining ring 19, which may be composed of several sections, is then placed between the flanges 10 and 11 which are then bolted together, thus backing the fused ends of the lead liners. This ring and the flanges form a pocket or recess which withstands any tendency of the fused ends of the lead liners to creep outwardly between the flanges. Instead of blocking or retaining ring 19, it is possible to employ a sealing ring to which the fused ends of the lead liners may be fused.

Again it will be apparent that no substantial mechanical pressure is required to be exerted upon any portion of the lead liner members 5 and 6 to form a pressure-tight seal, notwithstanding that it is the lead lining which forms the pressure-tight seal.

It will be understood that the construction shown in any of the Figures 2, 3 and 4 may be utilized to connect any two adjacent tower sections.

In Figure 4 of the drawing, is shown, the detail of a modification of the pressure-tight joining and suspension illustrated in Figure 3. Here the flanges 10' and 11' of tower sections 3' and 4', respectively, are sloped to provide outwardly diverging lead liner retaining planes 20 and 21, respectively. The edges of the lead liners, 5' and 6', are spread as shown and fused together at 18', to form a smooth vertical surface which is positioned adjacent to retaining ring 19'. Bolts 17' hold the assembly together as shown and heretofore described. This modification is of particular utility in a vessel subjected to pulsating pressure or alternately pressurized and depressurized operations, especially operations in which ultimately pressure is reduced to a vacuum stage. Again, it will be apparent that the lead liner members are not subjected to any substantial mechanical pressure to form a pressure-tight seal, notwithstanding that it is the lead lining which forms the pressure-tight seal. The recess formed by planes 20 and 21 and retaining ring 19, held together by bolts 17 positively prevents any creep due to fluid pressure prevailing in the tower. The bottom of the tower can advantageously be assembled together employing a method very similar to that described in connection with Figures 3 or 4.

It will be evident to those skilled in this art that there is no possibility of "blowouts" in any of the foregoing embodiments of the apparatus of this invention.

It will be obvious to one skilled in the art that instead of lead, the invention can be applied to any metal or alloy, or other material having creeping characteristics in substance like those of lead, which may be used as illustrated herein, or for the lining of pipes or other fluid containers or conduits.

It will also be evident that modification and variation are possible within the scope of the method and the apparatus of the invention the essence of which is the provision of a readily formed pressure-tight seal upon a vessel lined with a material of little or no elasticity, for example lead.

We claim:

A vessel comprising a plurality of tubular sections, each having upper and lower outwardly extending flanged ends, means for interconnecting the upper and lower flanged ends of adjacent sections, non-corrosive malleable tubular liners for the sections, each liner having upper and lower outwardly extending flanged ends, the upper and lower flanged ends of adjacent liners being positioned between the upper and lower flanged ends of adjacent sections but having their outer peripheral edges terminating short of the outer peripheral edges of the flanged ends of the sections providing a space inwardly of the ends of said sections, a ring in said space positioned adjacent the ends of said liners to maintain the upper and lower flanged ends of adjacent sections spaced apart a predetermined distance and to prevent exertion of pressure on the flanged ends of the liners, sealing means between the ring and flanged ends of adjacent liners, said sealing means being fused to the liner ends and ring to secure the liners to the ring in order to prevent any substantial outward movement of the liner flanged ends and closure means for the top and bottom sections to provide a pressure tight vessel.

JAMES I. HARPER.
FRANK R. SHUMAN, Jr.
RALPH C. PETERS.

REFERENCES CITED

The following references are of record in the file of this patent:

UNITED STATES PATENTS

| Number | Name | Date |
| --- | --- | --- |
| 746,440 | Austin | Dec. 8, 1903 |
| 899,338 | Shields | Sept. 22, 1908 |
| 1,440,109 | Schenck | Dec. 26, 1922 |
| 1,748,138 | McBride | Jan. 25, 1930 |
| 1,924,657 | Saine et al. | Aug. 29, 1933 |
| 1,948,211 | Fritz | Feb. 20, 1934 |
| 1,989,614 | Halpern et al. | Jan. 29, 1935 |
| 2,007,117 | Wiezevich | July 2, 1935 |
| 2,061,269 | Coakley | Nov. 17, 1936 |
| 2,157,357 | Straty | May 9, 1939 |
| 2,372,712 | Crawford | Apr. 3, 1945 |